United States Patent
Kawano et al.

(10) Patent No.: US 10,680,504 B2
(45) Date of Patent: Jun. 9, 2020

(54) BANDGAP REFERENCE CIRCUIT AND DCDC CONVERTER HAVING THE SAME

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: ABLIC INC., Chiba (JP)

( * ) Notice: Subject to any disclaimer, the term of this patent is extended or adjusted under 35 U.S.C. 154(b) by 273 days.

(21) Appl. No.: 15/490,059

(22) Filed: Apr. 18, 2017

(65) Prior Publication Data

US 2017/0310204 A1 Oct. 26, 2017

(30) Foreign Application Priority Data

Apr. 20, 2016 (JP) ................... 2016-084270

(51) Int. Cl.
*H02M 3/02* (2006.01)
*H02M 1/08* (2006.01)
*H02M 3/156* (2006.01)
*H02M 1/00* (2006.01)

(52) U.S. Cl.
CPC .............. *H02M 1/08* (2013.01); *H02M 3/02* (2013.01); *H02M 3/156* (2013.01); *H02M 2001/0025* (2013.01); *H02M 2001/0048* (2013.01); *Y02B 70/1491* (2013.01)

(58) Field of Classification Search
CPC .......................... H02M 3/02; H02M 2001/003
USPC .................................................. 307/130, 151
See application file for complete search history.

(56) References Cited

U.S. PATENT DOCUMENTS

| | | | | |
|---|---|---|---|---|
| 4,267,467 A * | 5/1981 | Tsukada | ............... | G04G 15/003 307/141 |
| 6,157,176 A * | 12/2000 | Pulvirenti | ............... | G05F 1/565 323/266 |
| 6,465,994 B1 * | 10/2002 | Xi | ........................... | G05F 1/575 323/274 |
| 7,157,892 B1 * | 1/2007 | Ritter | ...................... | G05F 1/468 323/284 |
| 8,098,057 B2 * | 1/2012 | Morino | ..................... | G05F 1/56 323/269 |
| 8,779,748 B2 * | 7/2014 | Gotoh | ................... | H02M 3/156 323/242 |
| 10,108,209 B2 * | 10/2018 | Ideno | ........................ | G05F 1/10 |
| 2005/0088159 A1 * | 4/2005 | Itohara | .................. | H02M 3/156 323/284 |

(Continued)

FOREIGN PATENT DOCUMENTS

JP 2010-160700 A 7/2010

*Primary Examiner* — Adi Amrany
(74) *Attorney, Agent, or Firm* — Brinks Gilson & Lione

(57) ABSTRACT

To provide a bandgap reference circuit capable of shortening a start time at power-on in a circuit lowered in power consumption. There is provided a bandgap reference circuit using an op amplifier to generate a reference voltage, which is equipped with a first current source connected between a power supply terminal and an operating current input terminal of the op amplifier, a second current source having one end connected to the power supply terminal, and a switch connected between the other end of the second current source and the operating current input terminal of the op amplifier, and in which a switch is turned on at power-on and turned off after starting of the reference voltage.

5 Claims, 3 Drawing Sheets

(56) References Cited

U.S. PATENT DOCUMENTS

| | | | |
|---|---|---|---|
| 2008/0224675 A1* | 9/2008 | Takagi | G05F 1/565 |
| | | | 323/275 |
| 2009/0184671 A1* | 7/2009 | Kimura | H02M 1/36 |
| | | | 315/308 |
| 2012/0126772 A1* | 5/2012 | Yamakoshi | H02M 1/36 |
| | | | 323/284 |
| 2013/0113447 A1* | 5/2013 | Kadanka | G05F 1/56 |
| | | | 323/280 |
| 2013/0241507 A1* | 9/2013 | Hara | G05F 1/10 |
| | | | 323/282 |
| 2014/0266105 A1* | 9/2014 | Li | G05F 1/565 |
| | | | 323/280 |
| 2015/0381045 A1* | 12/2015 | Chen | H02M 3/156 |
| | | | 323/271 |
| 2016/0124447 A1* | 5/2016 | Kobayashi | G05F 1/575 |
| | | | 323/280 |
| 2016/0261198 A1* | 9/2016 | Li | H02M 1/15 |
| 2017/0070149 A1* | 3/2017 | Guan | G05F 1/46 |
| 2017/0214329 A1* | 7/2017 | Shi | H02M 1/08 |

* cited by examiner

BANDGAP REFERENCE CIRCUIT AND DCDC CONVERTER HAVING THE SAME

RELATED APPLICATIONS

This application claims priority under 35 U.S.C. § 119 to Japanese Patent Application No. 2016-084270 filed on Apr. 20, 2016, the entire content of which is hereby incorporated by reference.

BACKGROUND OF THE INVENTION

Field of the Invention

The present invention relates to a bandgap reference circuit and a DCDC converter equipped therewith.

Background Art

The recent electronic devices, particularly, a smart phone, a portable device, a wearable device, etc. have been required to have low power consumption in order to prolong an operating time of a battery-driven product.

In the electronic devices as described above, a DCDC converter such as a switching regulator, an LDO regulator or the like has been used as a power supply device which supplies a power supply to a microcomputer, an AP (Application Processor), a memory, a sensor, etc. The DCDC converter outputs a constant voltage to an output terminal regardless of a voltage fluctuation at an input terminal and is required to highly maintain efficiency even though a current supplied from the output terminal to a load widely fluctuates from a low current to a large current. As to a device required to have low power consumption, it becomes particularly important to maintain high efficiency in a light load current region.

Such a DCDC converter requiring high efficiency at a light load needs to reduce power consumption of a bandgap reference circuit used within the DCDC converter. A problem however arises in that when power consumption is lowered, the time necessary to start up the bandgap reference circuit becomes long, so that the time up to the start of a switching operation of the DCDC converter becomes long.

It has been proposed to such a problem in Patent Document 1 that a PMOS transistor having a gate and drain commonly connected to an output terminal of a bandgap reference circuit is added to the output terminal, and current is supplied to the output terminal by the PMOS transistor during a period until the voltage of the output terminal reaches a prescribed level from the time of power-on to thereby shorten a start time of the bandgap reference circuit.

Patent Document 1

Japanese Patent Application Laid-Open No. 2010-160700

SUMMARY OF THE INVENTION

In the method in Patent Document 1, however, the threshold voltage of the PMOS transistor must be larger than the difference between a power supply voltage and the voltage of the output terminal.

Although depending on the voltage value of the power supply voltage, the voltage of the output terminal is raised by the PMOS transistor immediately after power-on, there may be a case where the PMOS transistor is turned off before the voltage of the output terminal rises up to a desired voltage value.

Further, since the voltage of the output terminal is raised by the normal operation of the bandgap reference circuit after the PMOS transistor is turned off, the effect of the PMOS transistor is not obtained.

The present invention has been made in view of the foregoing problems and aims to provide a bandgap reference circuit capable of starting with low power consumption and in a short time, and a DCDC converter equipped therewith.

In order to solve the above problems, there is provided a bandgap reference circuit according to the present embodiment, which uses an op amplifier to generate a first reference voltage. The bandgap reference circuit is equipped with a first current source connected between a power supply terminal and an operating current input terminal of the op amplifier, a second current source having one end connected to the power supply terminal, a switch connected between the other end of the second current source and the operating current input terminal of the op amplifier, and a control circuit which generates a control signal controlling on/off of the switch. The switch is turned on when the control signal is a first state and turned off when the control signal is a second state.

A DCDC converter according to the present embodiment is equipped with the bandgap reference circuit and an error amplifier having an inversion input terminal inputted with a feedback voltage obtained by dividing an output voltage, and a non-inversion input terminal inputted with the first reference voltage.

A DCDC converter according to another embodiment is equipped with the bandgap reference circuit. The control circuit brings the control signal into a first state at power-on and brings the control signal into a second state, based on the completion of a soft start executed from the time of the power-on.

A DCDC converter according to a further embodiment is equipped with the bandgap reference circuit. The control circuit brings the control signal into a first state in a PWM mode, and brings the control signal into a second state in a PFM mode.

According to a bandgap reference circuit according to the present embodiment, a switch is turned on with a control signal as a first state upon power-on to supply operating currents to an op amplifier from both of a first current source and a second current source and thereby raise a first reference voltage to a desired voltage value in a short time (i.e., start the first reference voltage). Thereafter, the switch is turned off with the control signal as a second state, thereby making it possible to suppress power consumption while shortening a start time.

Further, the bandgap reference circuit according to the present embodiment can particularly be suitably applied to a DCDC converter of low power consumption. Even in this case, a start time at power-on can be shortened. Further, in a PWM mode (at heavy load), the response of the first reference voltage can be enhanced by turning on the switch. In a PFM mode (at light load), power consumption can be suppressed by turning off the switch. It is thus possible to provide a DCDC converter capable of high efficiency and stable operation.

DETAILED DESCRIPTION OF THE PREFERRED EMBODIMENTS

Embodiments of the present invention will hereinafter be described with reference to the accompanying drawings.

Figure 1:
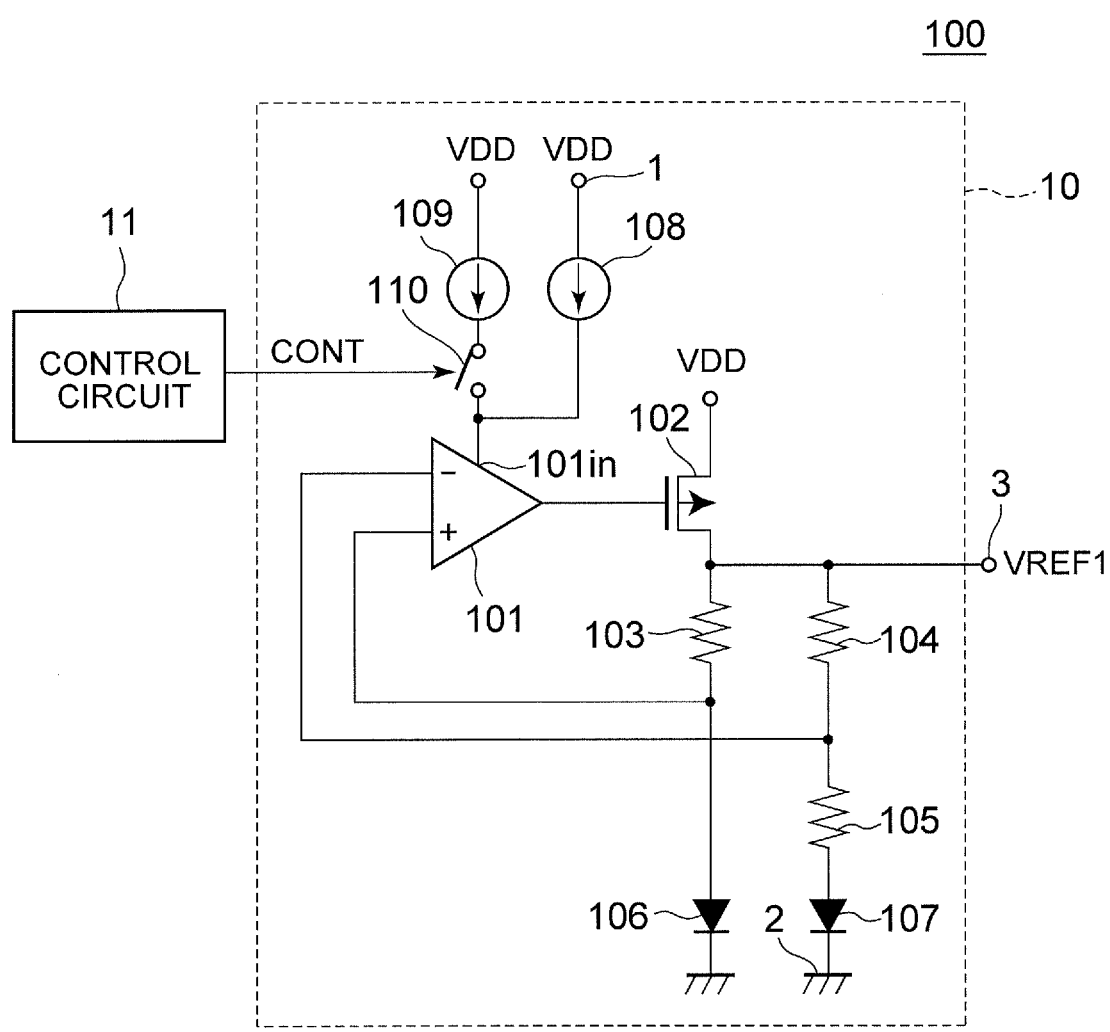
FIG. 1 is a circuit diagram of a bandgap reference circuit according to an embodiment of the present invention.

FIG. 1 is a circuit diagram of a bandgap reference circuit 100 according to the present embodiment.

The bandgap reference circuit 100 according to the present embodiment is comprised of a reference voltage generation circuit 10 and a control circuit 11 which generates a control signal CONT, and generates a reference voltage VREF1 at a reference voltage output terminal 3.

The reference voltage generation circuit 10 is equipped with an op amplifier 101, an output transistor 102 comprised of a PMOS transistor, resistive elements 103 to 105, diodes 106 and 107, current sources 108 and 109, and a switch 110.

The current source 108 is connected between a power supply terminal 1 supplied with a power supply voltage VDD and an operating current input terminal 101in of the op amplifier 101. The current source 109 has one end connected to the power supply terminal 1. The switch 110 is connected between the other end of the current source 109 and the operating current input terminal 101in of the op amplifier 101 and is on/off-controlled by the control signal CONT.

The output transistor 102 has a source connected to the power supply terminal 1, a drain connected to the reference voltage output terminal 3, and a gate connected to an output terminal of the op amplifier 101.

The resistive elements 104 and 105 and the diode 107 are connected in series between the reference voltage output terminal 3 and a ground terminal 2. The resistive element 103 and the diode 106 are connected in series between the reference voltage output terminal 3 and the ground terminal 2.

The op amplifier 101 has an inversion input terminal connected to a connecting point of the resistive elements 104 and 105, and a non-inversion input terminal connected to a connecting point of the resistive element 103 and the diode 106.

With such a configuration, the reference voltage VREF1 is generated at the reference voltage output terminal 3.

The operation of the bandgap reference circuit 100 according to the present embodiment will next be described.

First, when the power supply voltage VDD is applied, the control circuit 11 brings the control signal CONT into a first state (e.g., a HIGH level). Thus, the switch 110 is turned on so that the operating current input terminal 101in of the op amplifier 101 is supplied with currents not only from the current source 108, but also from the current source 109.

Since the op amplifier 101 is operated by the operating currents inputted to the operating current input terminal 101in, the op amplifier 101 is capable of quick operation by being supplied with the operating currents from the two current sources 108 and 109 as described above. Thus, it is possible to raise the reference voltage VREF1 to a desired voltage value in a short time after the application of power.

Thereafter, the control circuit 11 brings the control signal CONT into a second state (e.g., a LOW level), based on the raising of the reference voltage VREF1 to the desired voltage value. Thus, the switch 110 is turned off so that the operating current input terminal 101in of the op amplifier 101 is supplied with the operating current only from the current source 108. Therefore, after the reference voltage VREF1 is started after power-on, power consumption can be suppressed.

Incidentally, the configuration of switching the control signal CONT from the first state to the second state by the control circuit 11 can be realized as follows.

The control circuit 11 is configured to measure in advance the time from power-on to reaching of the reference voltage VREF1 to the desired voltage value in the state in which the switch 110 is turned on, count the time by a timer from the time of power-on, and switch the control signal CONT from the first state to the second state, based on reaching of an elapsed time from the time of power-on to the pre-measured time.

Thus, according to the bandgap reference circuit 100 according to the present embodiment, it is possible to shorten a start time and suppress power consumption.

Examples in which the bandgap reference circuit 100 according to the present embodiment is applied to DCDC converters will next be described using FIGS. 2 and 3.

Figure 2:
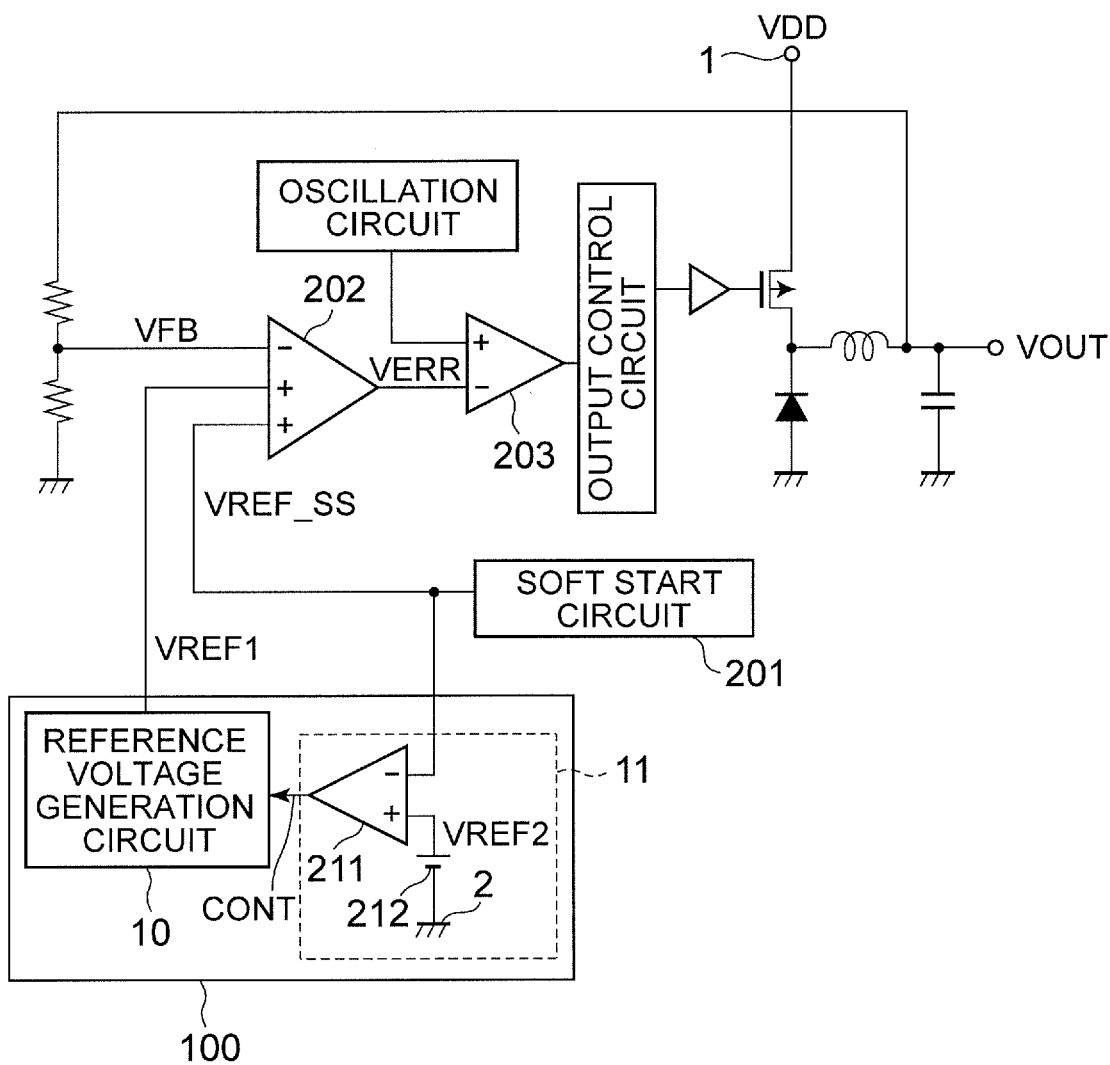
FIG. 2 is a circuit diagram illustrating one example of a DCDC converter equipped with the bandgap reference circuit of FIG. 1.

FIG. 2 is a circuit diagram of a DCDC converter 200 which is one example of the DCDC converter equipped with the bandgap reference circuit 100 of FIG. 1.

Since the basic configuration of the DCDC converter 200 is general, its detailed description will be omitted here. A description will be made about how the bandgap reference circuit 100 is used in the DCDC converter 200.

The DCDC converter 200 of the present example is equipped with a soft start circuit 201 which outputs a soft start voltage VREF_SS for executing a soft start.

Two non-inversion input terminals of an error amplifier 202 are respectively inputted with a reference voltage VREF1 and a soft start voltage VREF_SS generated from the bandgap reference circuit 100. An inversion input terminal of the error amplifier 202 is inputted with a feedback voltage VFB obtained by dividing an output voltage VOUT of the DCDC converter 200.

The error amplifier 202 compares the lower one of the reference voltage VREF1 and the soft voltage start voltage VREF_SS and the feedback voltage VFB and outputs an error voltage VERR to a comparator 203.

Although the soft start voltage VREF_SS gradually rises after power-on, the feedback voltage VFB and the soft start voltage VREF_SS are compared by the error amplifier 202 when the soft start voltage VREF_SS is lower than the reference voltage VREF1, and the reference voltage VREF1 does not affect the error voltage VERR as the output of the error amplifier 202.

Then, when a prescribed soft start time elapses, the soft start voltage VREF_SS becomes higher than the reference voltage VREF1. Thus, thereafter, the feedback voltage VFB and the reference voltage VREF1 are compared by the error amplifier 202, and the soft start voltage VREF_SS does not exert influence on the error voltage VERR as the output of the error amplifier 202.

On the other hand, in the bandgap reference circuit 100 in the DCDC converter 200 of the present example, the control circuit 11 is configured to have a comparator 211 and a reference voltage source 212. The comparator 211 has an inversion input terminal inputted with the soft start voltage VREF_SS, and a non-inversion input terminal inputted with a reference voltage VREF2 of the reference voltage source 212. The reference voltage VREF2 is a prescribed voltage which becomes the reference of completion of the soft start.

After power-on, the bandgap reference circuit 100 is operated in the following manner simultaneously with the execution of the soft start such as described above.

Since the soft start voltage VREF_SS serves as the voltage which gradually rises from the ground potential after power-on, the soft start voltage VREF_SS is lower than the reference voltage VREF2 immediately after power-on. Therefore, the comparator 211 outputs a signal of a HIGH level. That is, the comparator 211 brings the control signal CONT into the first state. Consequently, the switch 110 illustrated in FIG. 1 is turned on to assume a state in which the currents are supplied from both of the current source 108 and the current source 109 to the operating current input terminal 101in of the op amplifier 101. Thus, the reference voltage VREF1 inputted to the error amplifier 202 is started in a short time after power-on.

Thereafter, when the soft start voltage VREF_SS further rises and becomes higher than the reference voltage VREF2, the comparator 211 outputs a signal of a LOW level. That is, the comparator 211 brings the control signal CONT into the second state. Consequently, the switch 110 illustrated in FIG. 1 is turned off to assume a state in which the current is supplied to the operating current input terminal 101in of the op amplifier 101 only from the current source 108. Thus, after power-on, power consumption of the bandgap reference circuit 100 can be suppressed after the reference voltage VREF1 is started.

Here, since it is necessary that the reference voltage VREF2 of the reference voltage source 212 which configures the control circuit 11 is a voltage which becomes the reference of completion of the soft start, and the reference voltage VREF1 completely reaches a desired voltage value when the soft start is completed and the object to be compared with the feedback voltage VFB in the error amplifier 202 is switched from the soft start voltage VREF_SS to the reference voltage VREF1, the reference voltage VREF2 is preferably set to a voltage value slightly higher than the reference voltage VREF1.

Thus, according to the DCDC converter 200 of the present example, the control signal CONT which controls the switch 110 in the bandgap reference circuit 100 by using the signal used in the soft start executed from the time of power-on can be switched from the first state at the time of power-on to the second state, based on the completion of the soft start.

Figure 3:
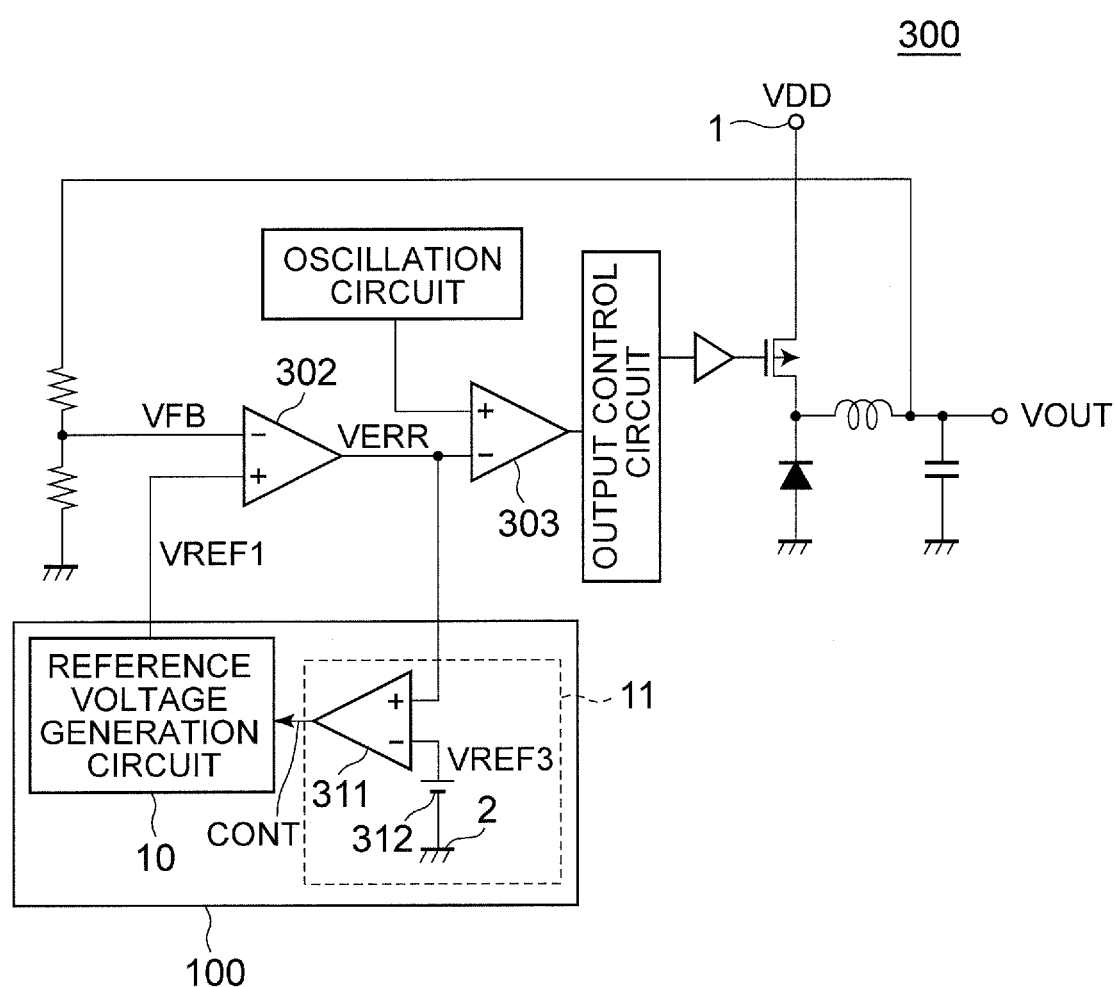
FIG. 3 is a circuit diagram illustrating another example of the DCDC converter equipped with the bandgap reference circuit of FIG. 1.

FIG. 3 is a circuit diagram of a DCDC converter 300 which is another example of the DCDC converter equipped with the bandgap reference circuit 100 of FIG. 1. Since the basic configuration of the DCDC converter 300 is general in a manner similar to the above DCDC converter 200, its detailed description will be omitted.

The DCDC converter 300 of the present example is configured to switch a switch 110 in a bandgap reference circuit 100 in synchronism with the switching between a PWM mode and a PFM mode.

Specifically, a control circuit 11 of the bandgap reference circuit 100 is equipped with a comparator 311 and a reference voltage source 312. The comparator 311 has an inversion input terminal inputted with a reference voltage VREF3 of the reference voltage source 312, and a non-inversion input terminal inputted with an error voltage VERR being an output of an error amplifier 302.

The error amplifier 302 has a non-inversion input terminal inputted with a reference voltage VREF1 generated by the bandgap reference circuit 100, and an inversion input terminal inputted with a feedback voltage VFB obtained by dividing an output voltage VOUT of the DCDC converter 300. The error amplifier 302 compares the reference voltage VREF1 and the feedback voltage VFB and outputs the error voltage VERR to a comparator 303.

The error voltage VERR becomes a high potential as the load connected to the DCDC converter 300 gets heavy, and becomes a low potential as the load gets light. Therefore, the reference voltage VREF3 is made into a prescribed voltage as a reference for switching between the PWM mode and the PFM mode to thereby switch a control signal CONT to a first state and a second state, based on the voltage value of the error voltage VERR.

With such a configuration, the comparator 311 outputs a signal of a HIGH level in the PWM mode in which the error voltage VERR is higher than the reference voltage VREF3. That is, the comparator 311 brings the control signal CONT into the first state. Thus, the switch 110 illustrated in FIG. 1 is turned on to assume a state in which currents are supplied from both of the current sources 108 and 109 to the operating current input terminal 101in of the op amplifier 101.

On the other hand, the comparator 311 outputs a signal of a LOW level in the PFM mode in which the error voltage VERR is lower than the reference voltage VREF3. That is, the comparator 311 brings the control signal CONT into the second state. Thus, the switch 110 illustrated in FIG. 1 is turned off to assume a state in which a current is supplied to the operating current input terminal 101in of the op amplifier 101 only from the current source 108.

In the PWM mode in which the load is a heavy load, switching is continuously performed, and charging and discharging are increased through a gate capacitance of a differential input transistor which configures the error amplifier 302. Therefore, the reference voltage VREF1 corresponding to the output of the bandgap reference circuit 100 also becomes easy to vary. According to the present example, however, since the operating current of the op amplifier 101 can be increased in the PWM mode, the reference voltage VREF1 can be immediately returned to a desired voltage value even though it varies.

Further, in the PFM mode in which the load is a light load, power consumption can be reduced by reducing the operating current of the op amplifier 101.

Thus, according to the DCDC converter 300 of the present example, the response of the reference voltage VREF1 can be enhanced in the PWM mode (at the heavy load). In the PFM mode (at the light load), the efficiency of the DCDC converter 300 can be improved by operating the bandgap reference circuit 100 with low current consumption.

Although the embodiments of the present invention have been described above, the present invention is not limited to the above embodiments. It is needless to say that various changes can be made thereto within the scope not departing from the gist of the present invention.

For example, in addition to the output signal CONT of the comparator 311 in the DCDC converter 300 illustrated in FIG. 3 being inputted to the reference voltage generation circuit 10 in the bandgap reference circuit 100 of the DCDC converter 200 illustrated in FIG. 2 to switch on/off of the switch 110 illustrated in FIG. 1 at power-on and after start-up, the DCDC converter 300 can also be configured to switch on/off of the switch 110 even in the PWM mode and PFM mode at its normal operation.

Further, although the control signal CONT is generated by the control circuit 11 in the DCDC converter 300 illustrated in FIG. 3, a signal for switching the PWM mode and the PFM mode may be directly inputted to the reference voltage generation circuit 10 as the control signal CONT where the signal is generated separately, so as to control on/off of the switch 110.

What is claimed is:

1. A DC-DC converter comprising:
a bandgap reference circuit comprising:
  an op amplifier to control generation of a first reference voltage;
  a first current source connected between a power supply terminal and an operating current input terminal of the op amplifier;
  a second current source having one end connected to the power supply terminal;
  a switch connected between the other end of the second current source and the operating current input terminal of the op amplifier; and
  a control circuit which generates a control signal controlling on/off of the switch,
  wherein the switch is turned on when the control signal is a first state and turned off when the control signal is a second state; and
an error amplifier coupled to the bandgap reference circuit, the error amplifier having an inversion input terminal inputted with a feedback voltage obtained by dividing an output voltage of the DC-DC converter, a non-inversion input terminal inputted with the first reference voltage from the bandgap reference circuit, and an output of the error amplifier controlling, at least in part, the operation of the DC-DC converter;
wherein the control circuit has a comparator which compares a third reference voltage and an output voltage of the output of the error amplifier, to be a reference of switching from a pulse-width modulation (PWM) operation of the DC-DC converter to a pulse-frequency modulation (PFM) operation of the DC-DC converter, and outputs the control signal as an output signal based on the comparison.

2. A DC-DC converter comprising:
a bandgap reference circuit comprising:
  an op amplifier to control generation of a first reference voltage;
  a first current source connected between a power supply terminal and an operating current input terminal of the op amplifier;
  a second current source having one end connected to the power supply terminal;
  a switch connected between the other end of the second current source and the operating current input terminal of the op amplifier; and
  a control circuit which generates a control signal controlling on/off of the switch,
  wherein the switch is turned on when the control signal is the first state and turned off when the control signal is the second state, and
  wherein the control circuit brings the control signal into the first state at a time of a pulse-width modulation (PWM) operation of the DC-DC converter, and brings the control signal into the second state at a time of a pulse-frequency modulation (PFM) operation of the DC-DC converter; and an error amplifier coupled to the bandgap reference circuit, the error amplifier having an inversion input terminal inputted with a feedback voltage obtained by dividing an output voltage of the DC-DC converter, a non-inversion input terminal inputted with the first reference voltage from the bandgap reference circuit, and an output of the error amplifier controlling, at least in part, the operation of the DC-DC converter in response to the feedback voltage,
wherein the control circuit has a comparator which compares a third reference voltage and an output voltage of the output of the error amplifier, to be a reference of switching from the PWM operation to the PFM operation, and outputs the control signal as an output signal.

3. The DC-DC converter according to claim 2,
wherein the comparator brings the control signal into the first state when the output voltage of the output of the error amplifier is higher than the third reference voltage, and brings the control signal into the second state when the output voltage of the output of the error amplifier is lower than the third reference voltage.

4. A bandgap reference circuit comprising:
an op amplifier to control generation of a first reference voltage;
a first current source connected between a power supply terminal and an operating current input terminal of the op amplifier;
a second current source having one end connected to the power supply terminal;
a switch connected between the other end of the second current source and the operating current input terminal of the op amplifier; and
a control circuit configured to change a control signal generated by the control circuit from a first state to a second state,
wherein the control signal controls the switch to turn the switch on when the control signal is the first state and to turn the switch off when the control signal is the second state,
wherein the control circuit has a comparator which compares a third reference voltage and an output voltage of the output of the error amplifier, to be a reference of switching from a pulse-width modulation (PWM) operation of the DC-DC converter to a pulse-frequency modulation (PFM) operation of the DC-DC converter, and outputs the control signal as an output signal based on the comparison.

5. A DC-DC converter comprising:
the bandgap reference circuit according to claim 4; and
an error amplifier coupled to the bandgap reference circuit, the error amplifier having an inversion input terminal inputted with a feedback voltage obtained by dividing an output voltage of the DC-DC converter, and a non-inversion input terminal inputted with the first reference voltage from the bandgap reference circuit, and an output of the error amplifier controlling, at least in part, the operation of the DC-DC converter.

* * * * *